US008345769B1

(12) United States Patent  
Diard

(10) Patent No.: US 8,345,769 B1  
(45) Date of Patent: Jan. 1, 2013

(54) REAL-TIME VIDEO SEGMENTATION ON A GPU FOR SCENE AND TAKE INDEXING

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1386 days.

(21) Appl. No.: 11/733,459

(22) Filed: Apr. 10, 2007

(51) Int. Cl.
*H04N 11/00* (2006.01)

(52) U.S. Cl. ............... 375/240.24; 375/240.18; 725/38; 455/439; 711/112

(58) Field of Classification Search ............ 375/240.25, 375/240.18; 725/38; 455/439; 711/112
See application file for complete search history.

(56) References Cited

U.S. PATENT DOCUMENTS

| | | | | |
|---|---|---|---|---|
| 5,446,497 A * | 8/1995 | Keating et al. | ................. | 348/443 |
| 5,655,117 A * | 8/1997 | Goldberg et al. | ..................... | 1/1 |
| 5,974,219 A * | 10/1999 | Fujita et al. | .................... | 386/290 |
| 6,321,024 B1* | 11/2001 | Fujita et al. | .................... | 386/281 |
| 6,661,842 B1* | 12/2003 | Abousleman | ............ | 375/240.11 |
| 6,810,144 B2 | 10/2004 | McGee et al. | | |
| 6,964,021 B2* | 11/2005 | Jun et al. | ........................ | 715/723 |
| 2001/0031005 A1* | 10/2001 | Nister et al. | ............. | 375/240.16 |
| 2002/0051010 A1* | 5/2002 | Jun et al. | ........................ | 345/723 |
| 2002/0056095 A1* | 5/2002 | Uehara et al. | ................... | 725/38 |
| 2002/0146168 A1 | 10/2002 | Lee et al. | | |
| 2003/0023910 A1* | 1/2003 | Myler et al. | ................... | 714/704 |
| 2003/0142750 A1* | 7/2003 | Oguz et al. | ............... | 375/240.18 |
| 2007/0099619 A1* | 5/2007 | Parekh et al. | .................. | 455/439 |
| 2007/0160128 A1* | 7/2007 | Tian et al. | ...................... | 375/240 |
| 2007/0174545 A1* | 7/2007 | Okada et al. | ................... | 711/112 |
| 2007/0180488 A1* | 8/2007 | Walter et al. | ................... | 725/135 |
| 2009/0070850 A1* | 3/2009 | Lee | ............................... | 725/131 |
| 2011/0157193 A1* | 6/2011 | Boucher et al. | ............... | 345/505 |

OTHER PUBLICATIONS

Dailianas, Apostolos et al., "Comparison of Automatic Video Segmentation Algorithms", Department of Computer Science, Columbia University, 1995, 15 pages.
Office Action, U.S. Appl. No. 11/733,452 dated Dec. 20, 2011.

* cited by examiner

*Primary Examiner* — Kim Vu
*Assistant Examiner* — Sayed Beheshti Shirazi
(74) *Attorney, Agent, or Firm* — Patterson & Sheridan, LLP

(57) ABSTRACT

One embodiment of the present invention sets forth a technique that enables a user to reverse through video content based on scene transitions. By employing a graphics processing unit to compute one or more frame-to-frame correlation coefficients that measure the consistency of sequential images and a central processing unit to analyze the one or more correlation coefficients, a list of scene transitions may be generated in real-time. The list of scene transitions forms the basis for a content-based reverse user control within the playback application. The content-based reverse user control enables a more natural mechanism for reversing through video content, providing the user with a superior overall viewing experience.

20 Claims, 14 Drawing Sheets

REAL-TIME VIDEO SEGMENTATION ON A GPU FOR SCENE AND TAKE INDEXING

BACKGROUND OF THE INVENTION

1. Field of the Invention

Embodiments of the present invention relate generally to video playback and more specifically to real-time video segmentation on a GPU for scene and take indexing.

2. Description of the Related Art

A typical video playback application includes user controls for actions including "play," "pause," "stop," "fast forward," and "reverse." The video playback application may execute on a device such as a digital versatile disk (DVD), a personal computer (PC), or any other device configured to perform video playback. The "fast forward" controls are configured to advance the rate of playback in time. For example, asserting the fast forward control may cause the playback application to speed up the rate of playback by two times, four times, or any other useful rate. Similarly, asserting the reverse controls cause playback to reverse at a user selectable rate of, for example, one times the normal rate, two times the normal rate, or any other useful rate.

One drawback of this approach is that time-based forward and reverse controls do not match the actual structure of common video content or the desired outcome for the user. Video content is typically assembled from shorter continuous scenes of varying lengths of time, where each scene includes a short span of consistent subject matter. Reversing through previously viewed material is currently cumbersome because the reverse mechanism is based on time rather than content, which is a more naturally perceived type of progression.

One solution to this problem includes organizing video content into "chapters" and allowing the user to select which "chapter" of the video content they wish to view. While this solution exists in many DVD solutions, the granularity of the chapters is too large, precluding this solution from any useful fast forward or reverse application from a user's perspective.

As the foregoing illustrates, what is needed in the art is a mechanism for reversing or fast forwarding through video content that advances efficiently according to content rather than time.

SUMMARY OF THE INVENTION

One embodiment of the present invention sets forth a system for generating a list of content-based scene transitions within a stream of video data. The system includes a video decoder engine configured to receive the video data and to generate a plurality of video frames based on the video data, a frame buffer for storing the plurality of video frames, and a frame correlation engine configured to generate at least one correlation coefficient based on a comparison between at least two video frames in the plurality of video frames, where the at least one correlation coefficient is used to determine whether a scene boundary exists between any of the at least two video frames.

One advantage of the disclosed system is that the correlation coefficients allow a list of scene transitions to be formed based on the content of the video data. A playback application may then enable a content-based reverse functionality that provides a user with a more natural mechanism for reversing through the video content, thereby improving the overall viewing experience relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
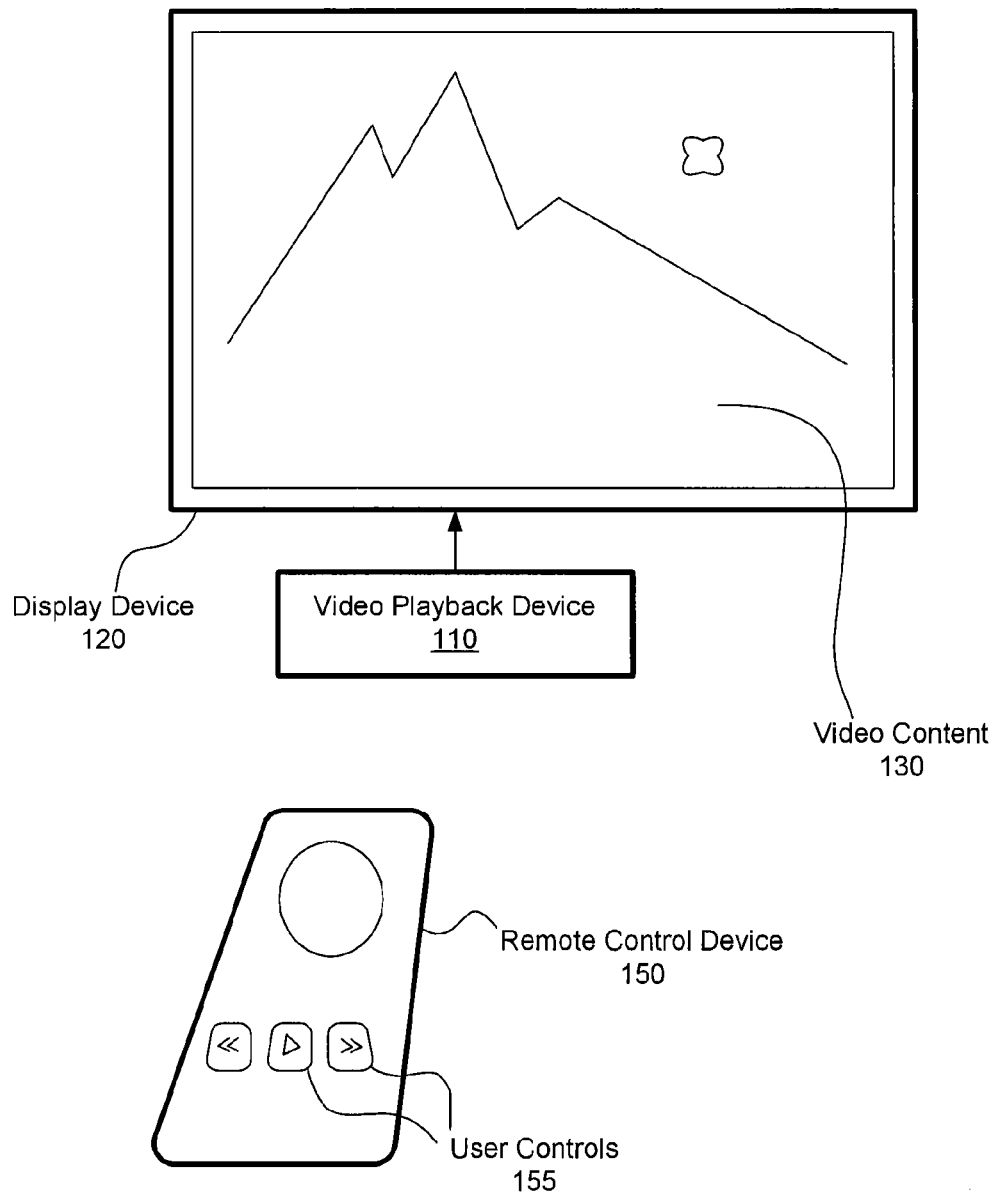
FIG. 1 is a conceptual diagram of an entertainment system in which one or more aspects of the invention may be implemented.

FIG. 1 is a conceptual diagram of an entertainment system in which one or more aspects of the invention may be implemented. The entertainment system includes, without limitation, a display device 120, a video playback device 110 and a remote control device 150. The display device 120 may be constructed using a cathode ray tube (CRT), liquid crystal display (LCD), plasma display, or any suitable display technology. The display device 120 presents sequential images, collectively referred to as video content 130. The video playback device 110 may be a digital versatile disk (DVD) player, a mass storage-based personal video recorder or any suitable player of digital media. The video playback device 110 includes a computing device configured to generate a video signal that corresponds to the video content 130 for display on the display device 120. The video playback device 110 responds to user commands entered into user controls 155 on the remote control device 150. The user controls 155 include, without limitation, "play," "reverse," and "fast forward" buttons used to control playback of stored video content 130. A separate "pause" button may be available, or the play button may alternate between play and pause functions.

Figure 2:
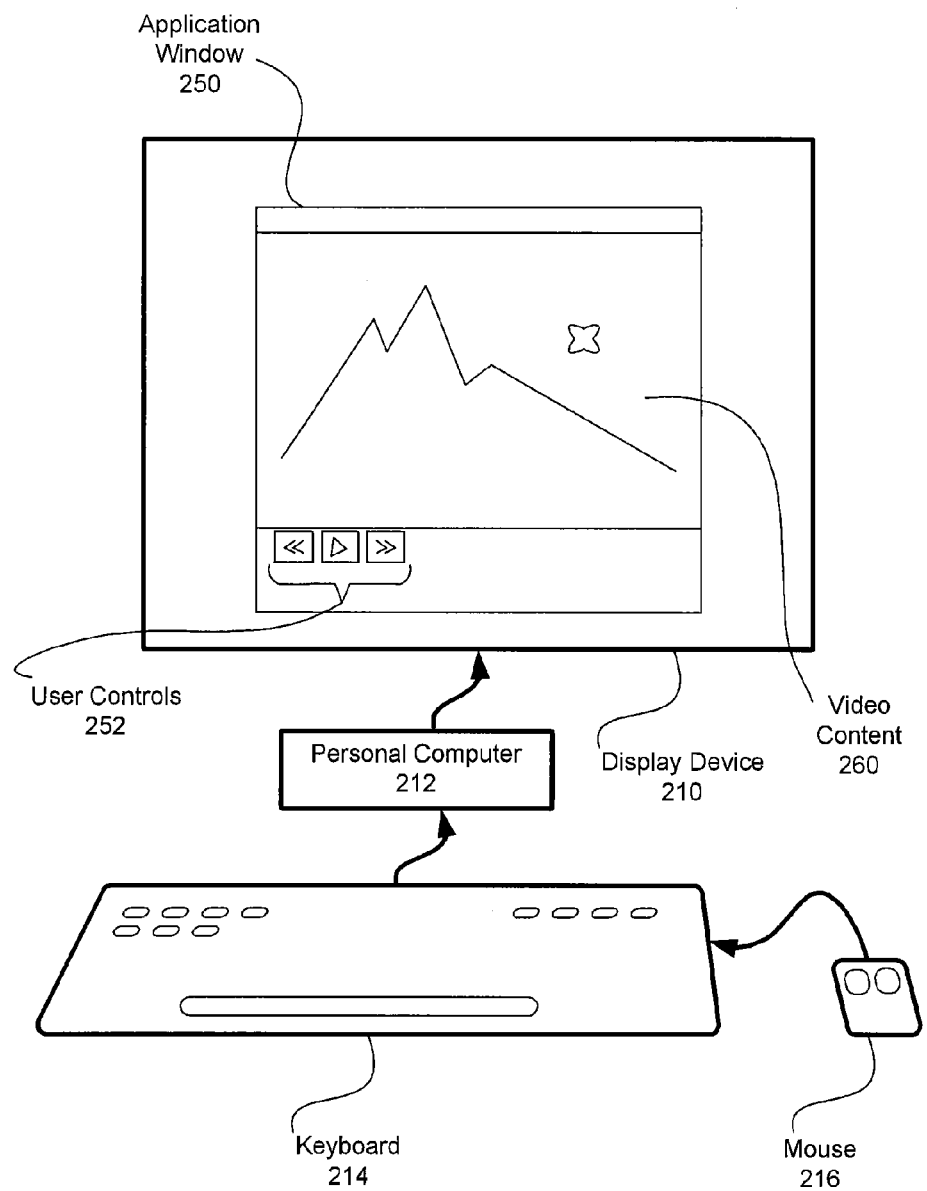
FIG. 2 is a conceptual diagram of a computer system in which one or more aspects of the invention may be implemented.

FIG. 2 is a conceptual diagram of a computer system in which one or more aspects of the invention may be implemented. The computer system includes, without limitation, a display device 210, a personal computer 212, a keyboard 214 and a mouse 216. Again, the display device 210 may be constructed using a cathode ray tube (CRT), liquid crystal display (LCD), plasma display, or any suitable display technology. The personal computer 212 may be any form of computing device configured to run a playback application that is capable decoding and presenting video content 260. A keyboard 214 and mouse 216 are attached to the personal computer 212 and provide the user with input means to control the application.

The display device 210 presents video data generated by the personal computer 212. The video data may include an application window 250. The application window 250 may include the video content 260 generated by the personal computer 212 and user controls 252 used to control the playback application. The user controls 252 generally reproduce the function of the remote control device 150 user controls 155 of FIG. 1, and include, without limitation, virtual "buttons" within the application window 250 for the "play," "pause," "reverse" and "fast forward."

Figure 3A:
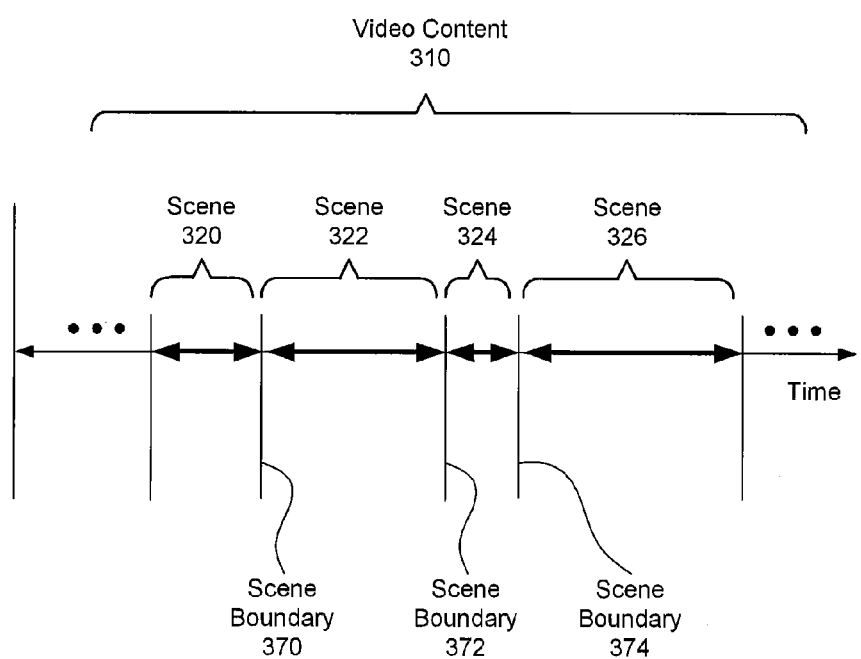
FIGS. 3A and 3B depict the structure of video content, according to one embodiment of the invention.

FIG. 3A depicts the structure of video content 310, according to one embodiment of the invention. The video content 310 generally corresponds to the video content 130 of FIG. 1 or the video content 260 of FIG. 2. The video content 310 may include a sequence of scenes ("segments") 320, 322, 324, 326 that are concatenated together. The scenes 320, 322, 324, 326 may range in duration from approximately one second to tens of seconds in length. Scene boundaries 370, 372 374 delineate substantially different scene content. For example, scene 322 may be a close-up shot of an inanimate object, while scene 324 may be a human face with an expression reacting to the inanimate object. In this scenario, scene boundary 372 delineates the boundary between the last frame showing the object and the first frame of the human face.

Figure 3B:
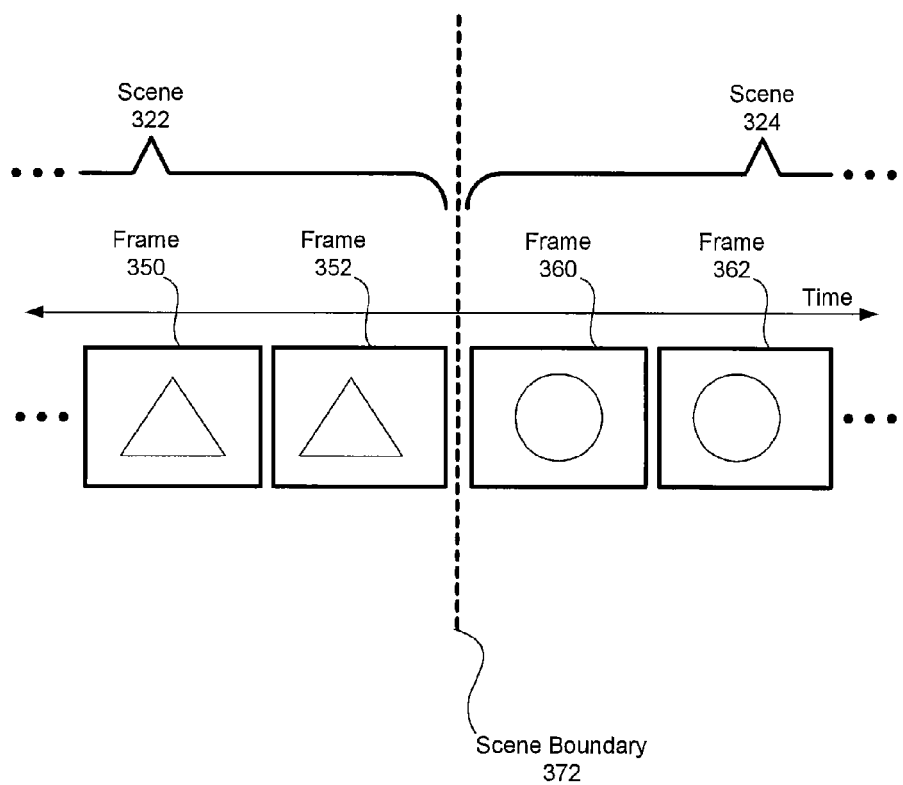

FIG. 3B depicts the structure of video content 310, according to one embodiment of the invention. The video content 310 includes a concatenated sequence of frames 350, 352, 360, 362, where frames 350 and 352 are associated with scene 322 and frames 360 and 362 are associated with scene 324. As shown, scene boundary 372 is situated between the last frame 352 of scene 322 and the first frame 360 of scene 324, thereby distinguishing scene 322 from scene 324.

Figure 4:
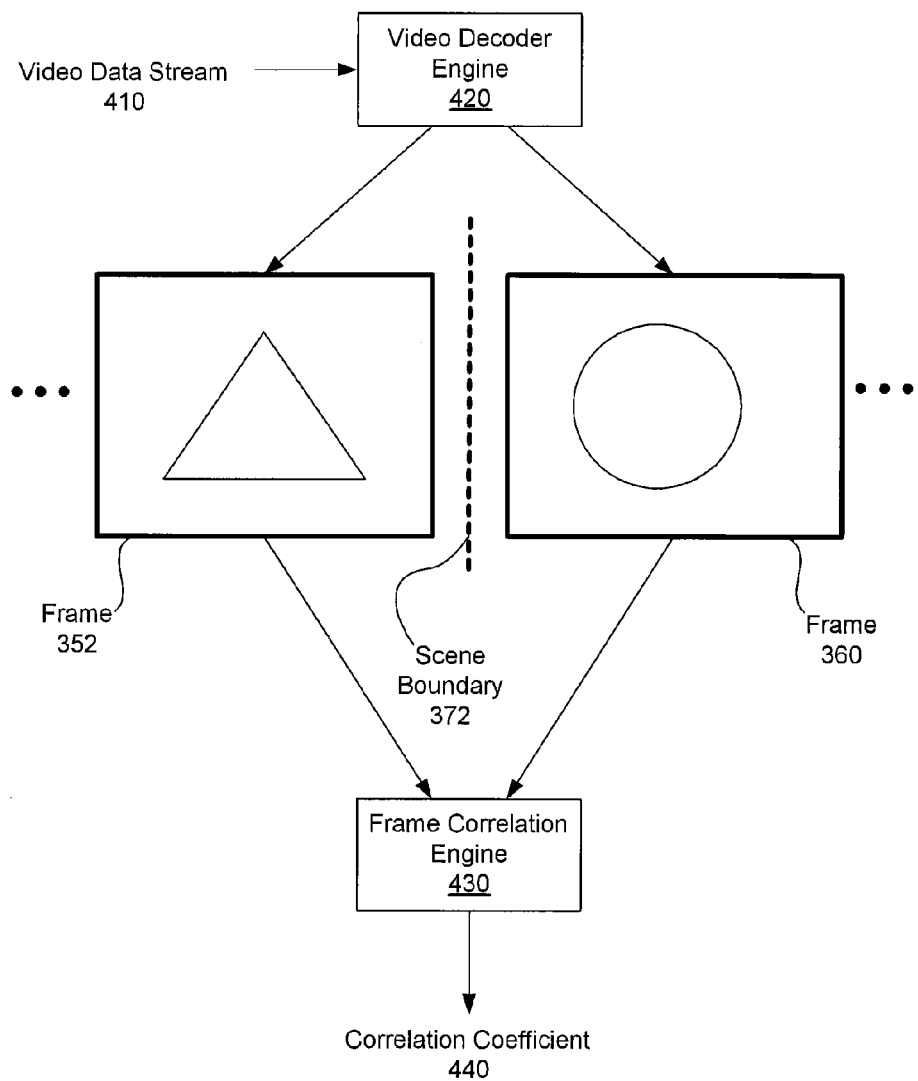
FIG. 4 illustrates the concept of reducing video frame data to correlation coefficient data, according to one embodiment of the invention.

FIG. 4 illustrates the concept of reducing video frame data to correlation coefficient data, according to one embodiment of the invention. A video stream 410 of encoded data enters a video decoder engine 420 in order to generate a sequential stream of video frames. At least two frames of decoded video data are stored for processing, including the frame 360 and the frame 352 from FIG. 3B. When the frame 360 and the frame 352 are associated with different scenes, then the scene boundary 372 may be present. Frames 360 and 352 may be stored in any appropriate memory subsystem, including frame buffer memory, system memory, or any other appropriate memory subsystem. A frame correlation engine 430 processes the frames 360 and 352 to generate at least one correlation coefficient 440 per pair of frames. The correlation coefficient 440 represents a measure of similarity between the frames 360 and 352. When the frames 360 and 352 are visually similar, the correlation coefficient should represent a high degree correlation. When the frames 360 and 352 are visually quite different, the correlation coefficient should represent a low degree of correlation. As the video stream progresses in time, each pair of sequential frames has at least one corresponding correlation coefficient used to assist in determining if a frame boundary exists between the pair of frames.

Figure 5A:
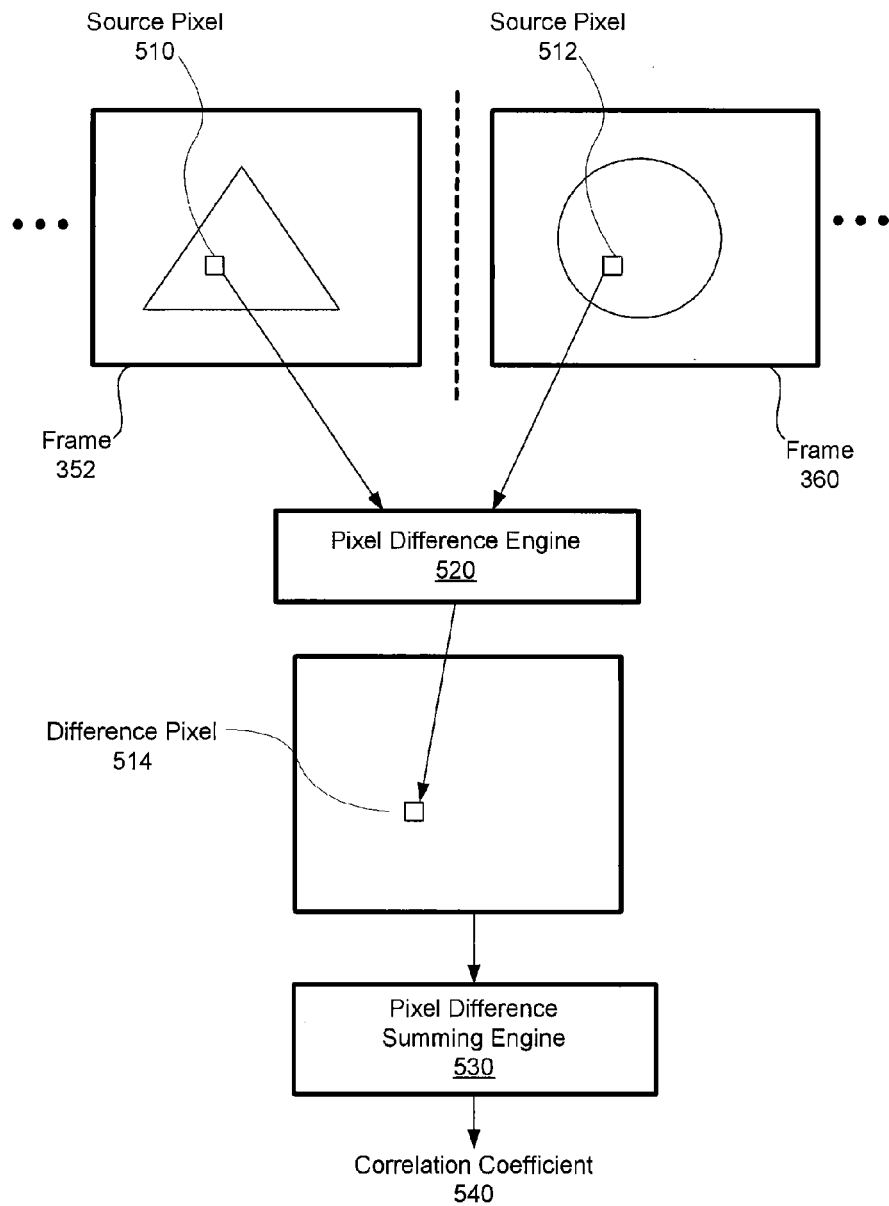
FIG. 5A illustrates a technique for computing correlation coefficients, according to one embodiment of the invention.

FIG. 5A illustrates a technique for computing correlation coefficients, according to one embodiment of the invention. The goal of computing a correlation coefficient is to process two frames of pixel data into a simplified measure that represents the visual similarity between the frames. A scalar correlation coefficient may be used as one such simplified measure of similarity. Each of frames 360 and 352 from FIG. 3B includes a two-dimensional plane of pixels, where each pixel may contain color intensity data. As shown in FIG. 5A, each source pixel 510 and 512 are processed by a pixel difference engine 520, which generates a difference pixel 514. The pixel difference engine 520 retrieves each source pixel 510 and 512 and performs any needed color space conversion to extract the corresponding luminance values for each source pixel 510 and 512. Persons skilled in the art are familiar with the common function of color space conversion. A difference function is then applied between the two luminance values. For example, the square of the difference of the two luminance values may be computed by the pixel difference engine 520. The resulting value may be stored as a difference pixel 514. The sum of the various difference pixel values is then computed by the summing engine pixel difference 530. The resulting sum is the correlation coefficient 540.

Figure 5B:
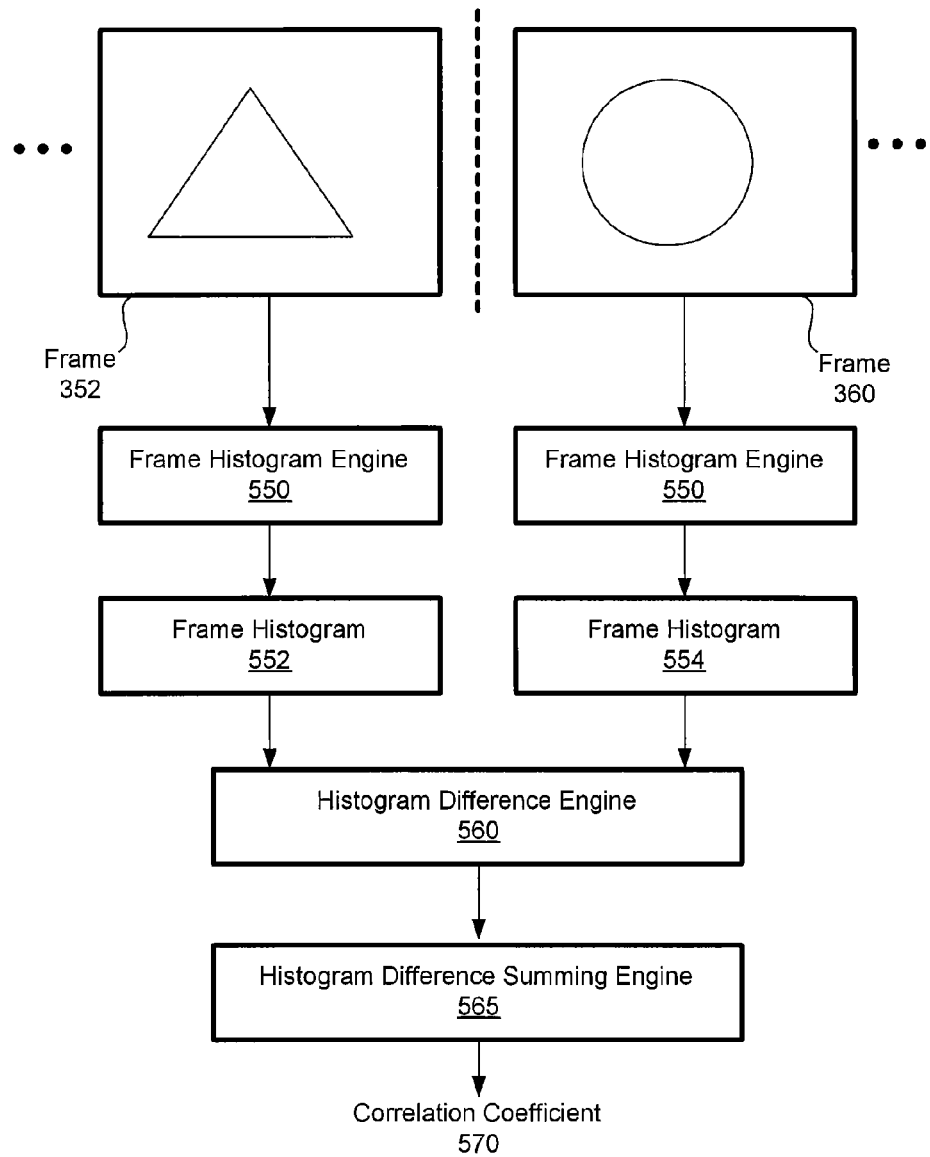
FIG. 5B illustrates a second technique for computing correlation coefficients, according to another embodiment of the invention.

FIG. 5B illustrates a second technique for computing correlation coefficients, according to another embodiment of the invention. A histogram of the luminance of each frame 352 and 360 is computed by a frame histogram engine 550, producing frame histograms 552 and 554, respectively. The frame histogram engine 550 performs any necessary color space conversion to extract the luminance of each pixel within the frame being processed. Histograms 552 and 554 of luminance for each frame are then computed. A histogram difference engine 560 computes the difference of each pair of elements in the histograms 552 and 554. The histogram difference engine 560 may compute each difference using a square of the difference. The histogram summing engine 565 sums the individual difference values and produces a correlation coefficient 570.

Figure 5C:
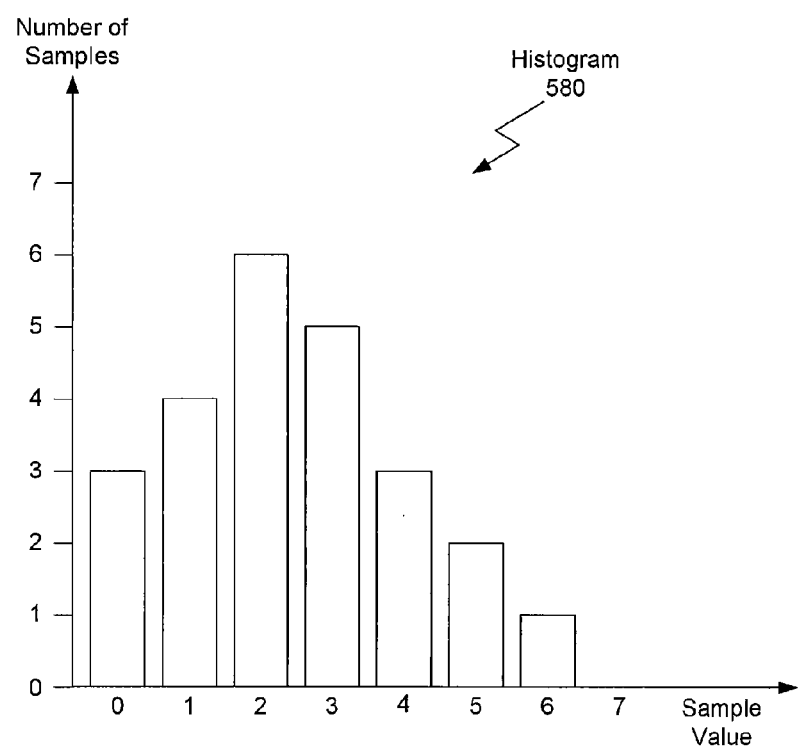
FIG. 5C is a conceptual illustration of a histogram.

FIG. 5C is a conceptual illustration of a histogram 580. The histogram 580 characterizes a set of data samples. The horizontal dimension represents a discrete sample value and the vertical dimension represents the number of samples encountered of the corresponding value. For example, the histogram 580 indicates that one sample was counted with a value of six, while five samples were counted with a value of three.

Figure 5D:
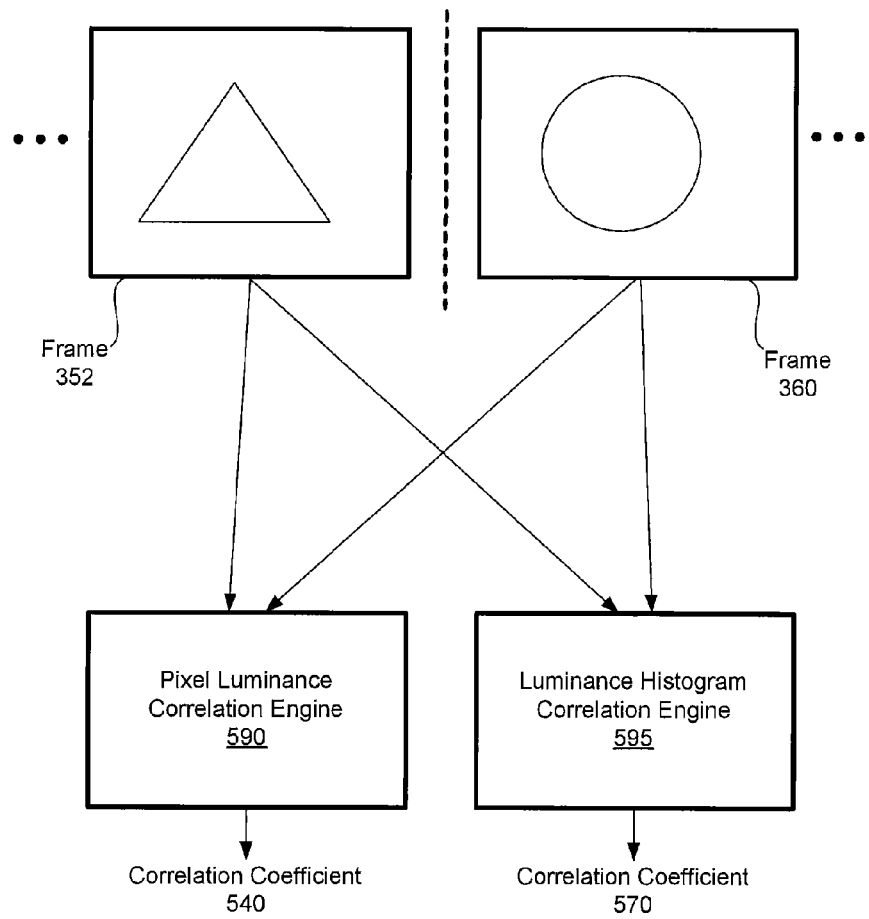
FIG. 5D illustrates a third technique for computing correlation coefficients, according to yet another embodiment of the invention.

FIG. 5D illustrates a third technique for computing correlation coefficients, according to yet another embodiment of the invention. As shown, the frames 352 and 350 are both processed by a pixel luminance correlation engine 590, the functionality of which is described in FIG. 5A, and a luminance histogram correlation engine 595, the functionality of which is described in FIG. 5B. The pixel luminance correlation engine 590 computes the correlation coefficient 540, and the luminance histogram engine 595 computes the correlation coefficient 570. The correlation coefficient 540 may then be used in conjunction with correlation coefficient 570 to determine scene boundaries.

Figure 6:
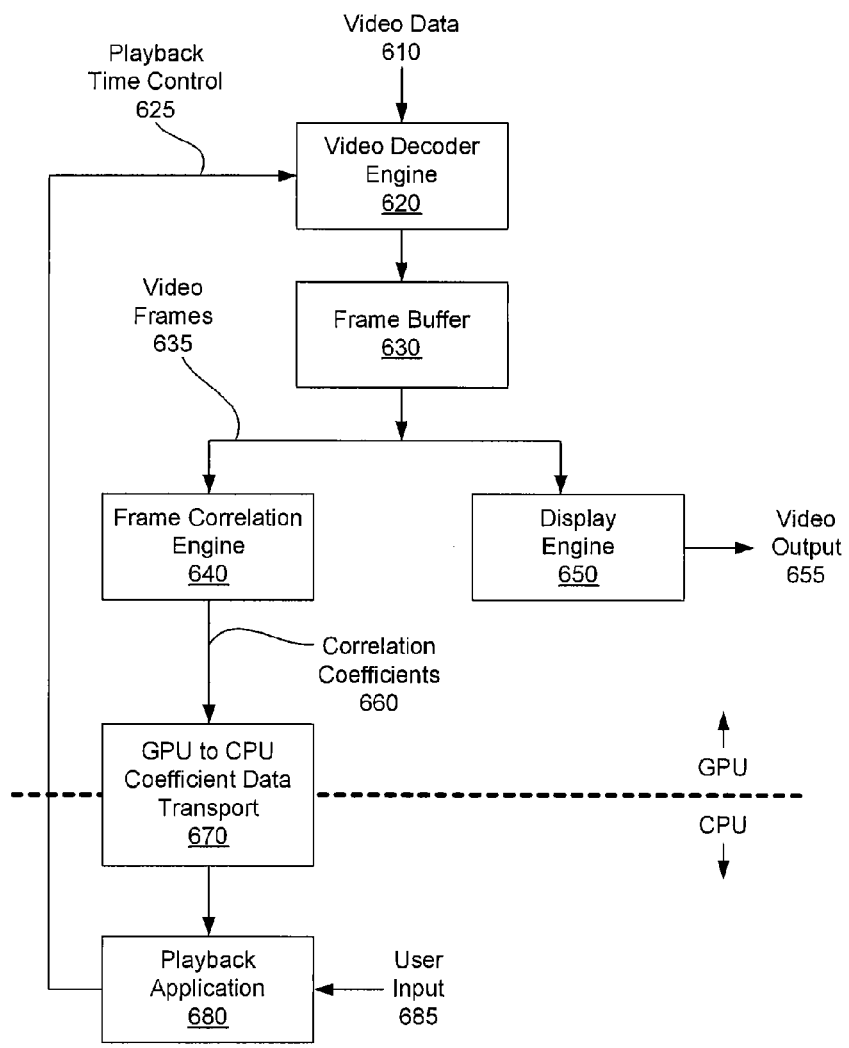
FIG. 6 illustrates the flow and processing of data from a video decoder engine through a playback application, according to one embodiment of the invention.

FIG. 6 illustrates the flow and processing of data from a video decoder engine 620 through a playback application 680, according to one embodiment of the invention. The video decoder engine 620 receives video data 610 from a storage device (not shown) and generates video frames 635, which are stored in a frame buffer 630. The frame buffer 630 typically retains only the most recent three to five video frames generated by the video decoder engine 620. The storage space for the current oldest video frame may be overwritten by a new frame being decoded by the video decoder engine 620. The number of video frames stored within the frame buffer 630 is limited to minimize the use of expensive frame buffer 630 resources. A display engine 650 retrieves the video frames 635 from the frame buffer 630 and generates a video output signal 655, which may be used by a display device (not shown) to display the video frames. A frame correlation engine 640 also retrieves the video frames from the frame buffer 630 for processing. The frame correlation engine 640 produces a stream of correlation coefficients 660, which are used to estimate the time location of scene transition boundaries associated with video frames 635. The correlation coefficients may be computed using any technique that generates one or more useful correlation coefficients, such as those techniques described in FIG. 5A, 5B or 5D. When a new video frame is generated by the video decoder engine 620, the frame correlation engine 640 may respond by computing any related correlation coefficients. A GPU to CPU coefficient data transport 670 transports the correlation coefficients 660 to a host CPU (not shown) using any technically feasible means.

The host CPU executes a playback application 680 that processes the correlation coefficients 660 to generate an index list of scene transitions. The index list of scene transitions may include one or more entries indicating the relative time within the video data 610 where a scene transition was detected during the course of real-time playback. The playback application 680 also guides the video play back process. For example, the playback application 680 generates a playback time control 625 used by the video decoder engine 620 to determine which portion of the video data 610 to decode and play. The playback application 680 also receives user input 685, such as "play" and "reverse" commands that are used to compute the playback time control 625. The playback application 680 may use the index list of scene transitions to generate the playback time control 625 that guides the sequencing of "reverse" viewing by content. In contrast, prior art playback applications are typically limited to using only time as the sequencing mechanism for reverse viewing operations. Because the index list of scene transitions includes only those scenes that have already been viewed, only a reverse operation may be conveniently supported by the flow of data depicted in FIG. 6. The user input 685 corresponds to the user controls 155 in FIG. 1 or the user controls 252 of FIG. 2. The video output 655 corresponds to the video content 130 of FIG. 1 or the video content 260 of FIG. 2.

Figure 7:
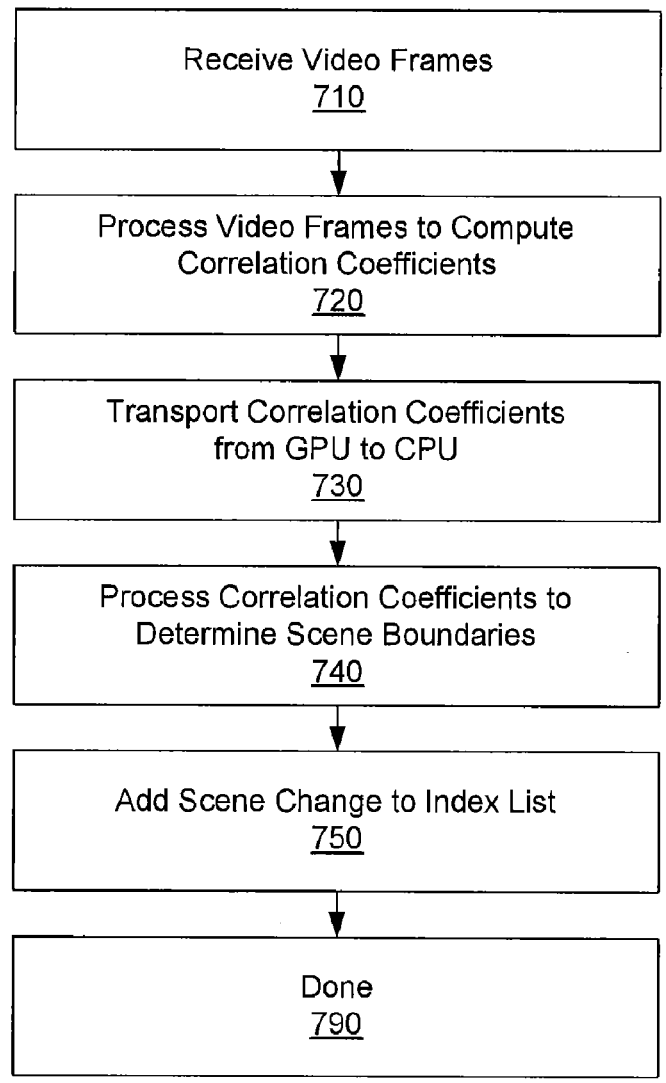
FIG. 7 is a flow diagram of method steps for reducing video frames that have already been viewed to an index list of scene transitions, according to one embodiment of the invention.

FIG. 7 is a flow diagram of method steps for reducing video frames that have been viewed to an index list of scene transitions, according to one embodiment of the invention. Although the method steps are described in conjunction with the systems described herein, persons skilled in the art will understand that any system that performs the method steps, in any order, is within the scope of the invention.

The method begins in step 710, where the frame correlation engine 640 receives video frames 635 for processing. This occurs when the video decoder engine 620 decodes a new frame, allowing the frame correlation engine 640 to processes another pair of frames. In step 720, the frame correlation engine 640 processes the video frames 635 to compute correlation coefficients 660. In step 730, the GPU to CPU coefficient data transport 670 copies the correlation coefficients 660 to the CPU for processing by the playback application 680. In step 740, the correlation coefficients 660 are processed by the playback application 680 to determine the location of scene boundaries for the purpose of building an index list. The processing may include, for example, examining differences between sequential correlation coefficients 660 and using a mechanism of thresholds to mark scene boundaries. In step 750, a detected scene change is added to the index list. The method terminates in step 790.

Figure 8:
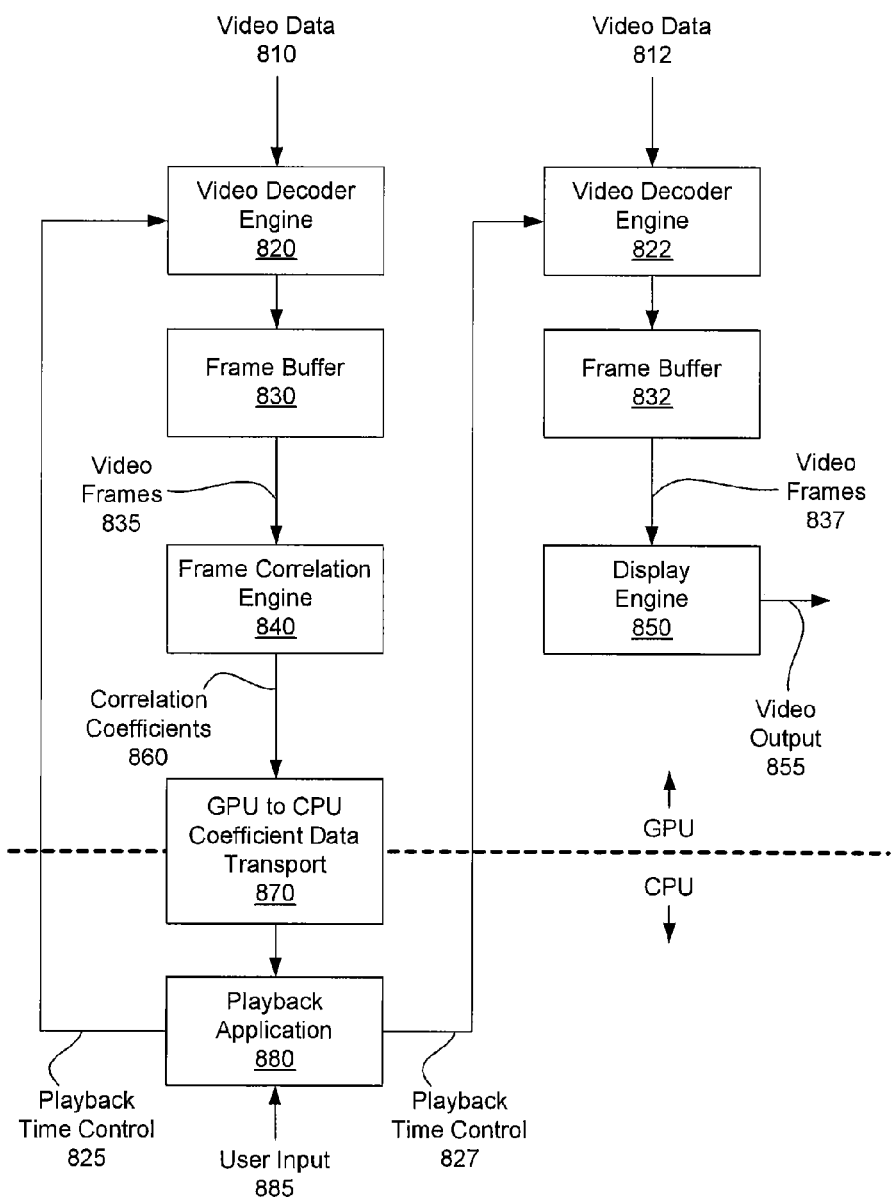
FIG. 8 illustrates the flow and processing of data from video decoder engines through a playback application, according to another embodiment of the invention.

FIG. 8 illustrates the flow and processing of data from video decoder engines 820 and 822 through a playback application 880, according to another embodiment of the invention. In this embodiment, two independent execution threads perform two separate tasks. The first task includes building an index list of scene transitions. The second task includes playback, such as real-time playback of video data. The video decode engine 820 receives video data 810 from a storage device (not shown) and generates video frames 835, which are stored in a frame buffer 830. A frame correlation engine 840 retrieves the video frames from the frame buffer 830 for processing. The frame correlation engine 840 produces a stream of correlation coefficients 860, which are used to estimate the time location of scene transition boundaries associated with video frames 635. The correlation coefficients may be computed using any technique that generates one or more useful correlation coefficients, such as those techniques described in FIG. 5A, 5B or 5D. A GPU to CPU coefficient data transport 870 uses any technically feasible means to transport the correlation coefficients 860 to a host CPU (not shown).

The host CPU executes a playback application 880 that guides the video play back process in both video decoder engines 820 and 822. For example, the playback application 880 generates a playback time control 825 used by the video decoder engine 820 to play through the video data 810 as quickly as possible to generate a scene transition table that includes, without limitation, a list of time stamps corresponding to computed scene boundaries within the video data 810.

The playback application 880 also received user input 885, such as "play" and "reverse" commands that are used to compute the playback time control 827. The user input 885 corresponds to the user controls 155 in FIG. 1 or the user controls 252 of FIG. 2. The video decoder engine 822 uses the playback time control 827 to determine which portion of video data 812 to decode and play. Video data 812 and video data 810 represent two independently read versions of the same video data source (such as a file). The video decoder engine 822 decodes video data 812 into frames within a frame buffer 832. A display engine 850 retrieves video frames 637 from the frame buffer 832 and generates a video output signal 855, which may be used by a display device (not shown) to display the video frames. The video output 855 corresponds to the video content 130 of FIG. 1 or the video content 260 of FIG. 2.

The first execution thread includes the computation associated with the video decoder engine 820, the frame correlation engine 840 and the GPU to CPU coefficient data transport 870, along with storage associated with frame buffer 830. This execution thread generates the index list of scene transitions. The second execution thread includes the video decoder engine 822 and display engine 850, along with storage associated with frame buffer 832. This second execution thread generates the video playback seen by a user. Because the first execution thread may process video data 810 significantly faster than real-time to assemble the index list of scene transitions for use by the second (playback) thread, this second embodiment may provide "fast forward by content" operation in addition to "reverse by content" operation.

Figure 9:
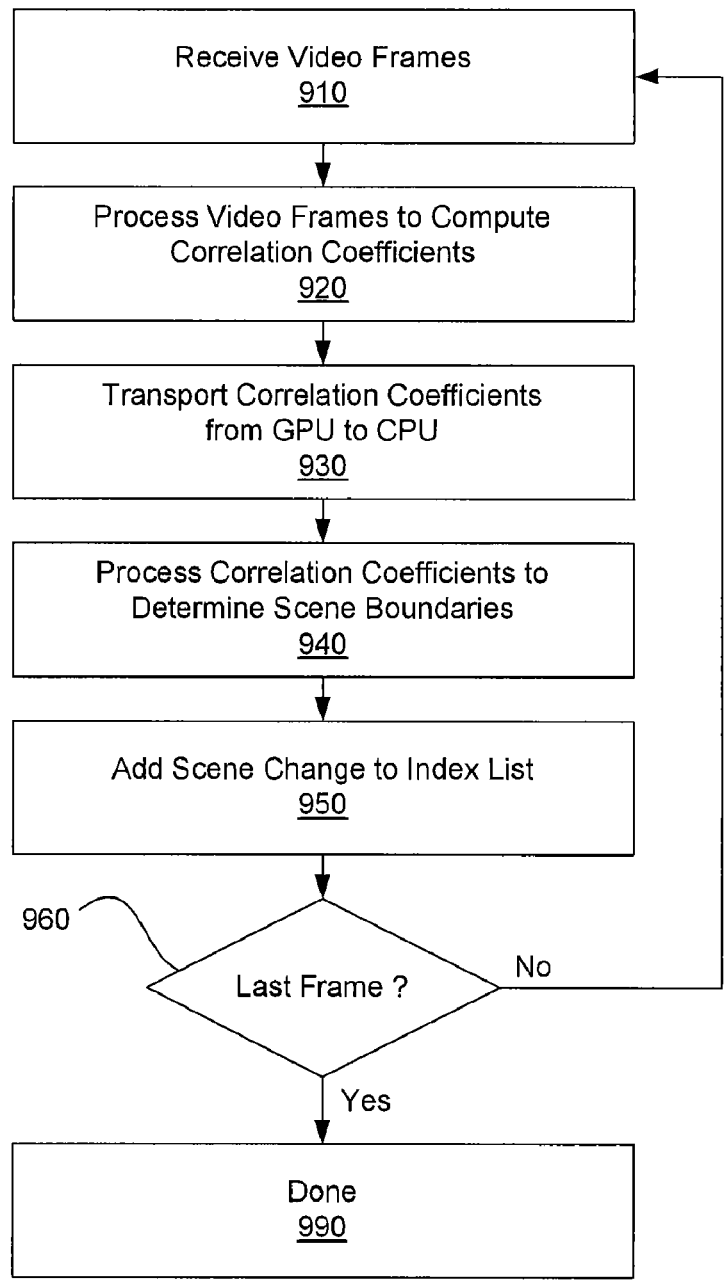
FIG. 9 is a flow diagram of method steps for reducing video frames to an index list of scene transitions, according to one embodiment of the invention.

FIG. 9 is a flow diagram of method steps for reducing video frames to an index list of scene transitions, according to one embodiment of the invention. Although the method steps are described in conjunction with the systems described herein, persons skilled in the art will understand that any system that performs the method steps, in any order, is within the scope of the invention. Persons skilled in the art also will recognize that the method steps are followed by one of the two execution threads described above in conjunction with FIG. 8.

The method begins in step 910, where the frame correlation engine 840 receives video frames 835 for processing. In step 920, the frame correlation engine 840 processes the video frames 835 to compute correlation coefficients 860. In step 930, the GPU to CPU coefficient data transport 870 copies the correlation coefficients 860 to the CPU for processing by the playback application 880. In step 940, the correlation coefficients 860 are processed by the playback application 880 to determine the location of scene boundaries for the purpose of building an index list. The processing may include, for example, examining differences between sequential correlation coefficients 860 and using a mechanism of thresholds to mark scene boundaries. In step 950, a detected scene change is added to the index list. In step 960, if the last frame has not been processed, then the method returns to step 910. In step 960, if the last frame has been processed, then the method terminates in step 990.

As indicated, the method steps are followed until all of video frame generated from the video data 810 have been processed. Again, since the execution thread following the method steps most likely will be ahead of the execution thread responsible for generating the video output for display, the scene boundaries throughout the video data may be identified and indexed ahead of the display, allowing both "fast forward" and "reverse" viewing functionality.

Figure 10:
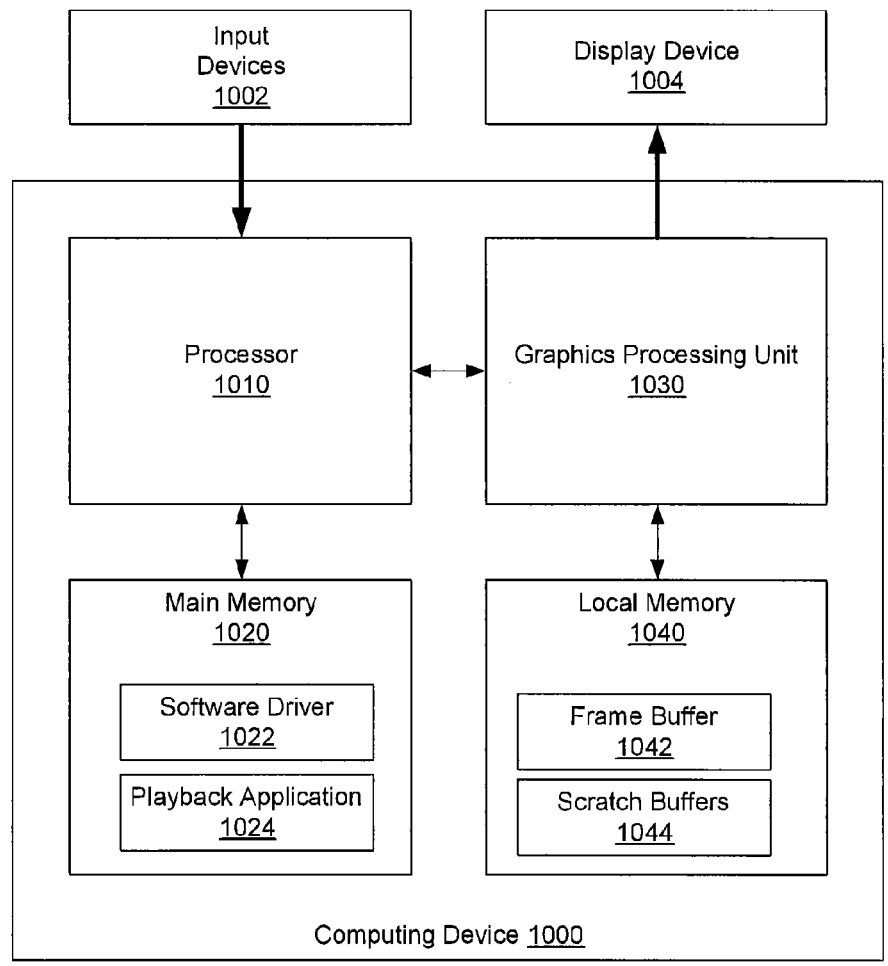
FIG. 10 is a conceptual diagram of a computing device in which one or more aspects of the invention may be implemented.

FIG. 10 is a conceptual diagram of a computing device 1000 in which one or more aspects of the invention may be implemented. The computing device 1000 may be connected to input devices 1002 and a display device 1004. The input devices 1002 may include buttons, a keyboard, a pointing device, sensors and linear and rotational controls. The display device 1004 may include a cathode ray tube (CRT), liquid crystal display (LCD), plasma display, or any device constructed using suitable display technology.

As shown, the computing device 1000 includes, without limitation, a processor 1010, main memory 1020, a graphics processing unit 1030, and a local memory 1040. The processor 1010 may include a central processing unit (CPU), such as a well-known x86 architecture CPU and related support logic. The main memory 1020 may include semiconductor memory, such as DRAM, SRAM, or any other suitable memory technology capable of performing random access memory functions. The graphics processing unit (GPU) 1030 may include any processing unit optimized to perform graphics-related operations as well as the video decoder engines and the frame correlation engines previously described herein. The local memory 1040 may include semiconductor memory, such as DRAM, SRAM, or any other suitable memory technology capable of performing random access memory functions.

The main memory 1020 includes, without limitation, a software driver 1022 to manage the operation of the GPU 1030 and a playback application 1024. The playback application 1024 may include, for example, the playback application 880 of FIG. 8 or the playback application 680 of FIG. 6. The local memory 1040 stores a frame buffer 1042 and scratch buffers 1044. The frame buffer 1042 may include frame buffers 830 and 832 from FIG. 8 or frame buffer 630 from FIG. 6. The scratch buffers 1044 may include, for example, frame histograms 552 and 554 from FIG. 5.

The video playback device 110 of FIG. 1 may be constructed according to the design of computing device 1000. Similarly, the personal computer 212 of FIG. 2 may be constructed according to the design of computing device 1000. In other embodiments, the computing device can be any type of desk-top computer, laptop computer, hand-held device, cellular phone, set-top box, etc. in which the teachings of the present invention may be implemented.

In sum, an index list of scene transitions for previously viewed video content may be constructed in real-time by computing frame-to-frame correlation coefficients in a GPU and assessing the correlation coefficients in a CPU. A playback application, residing in the CPU, may then use the index list of scene transitions to perform content-based reverse operations according to the scene transitions. In an alternate embodiment, the GPU and CPU execute the scene transition analysis in a second execution thread, independent of the main playback thread, to construct an index list of scene transitions. In this alternate embodiment, the scene transition analysis may be performed at a very high speed, allowing the index list of scene transitions to be assembled ahead of a fast forward request from the user. By performing scene transition analysis and generating an index list of scene transitions, the playback application may give the user the choice of advancing through the video content according to either content or time.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A system for generating a list of content-based scene transitions within a stream of video data, the system comprising:
   a first video decoder engine configured to receive the video data and to generate a first plurality of video frames based on the video data;
   a first frame buffer for storing the first plurality of video frames;
   a frame correlation engine configured to generate at least one correlation coefficient based on a comparison between at least two video frames in the first plurality of video frames;
   a graphics processing unit-to-central processing unit (GPU-to-CPU) coefficient data transport configured to transmit the at least one correlation coefficient to a playback application for determining whether a scene boundary exists between any of the at least two video frames based on the at least one correlation coefficient and for generating an entry in a list of scene transitions when a scene boundary exists;

a second video decoder engine configured to receive the video data and to generate a second plurality of video frames based on the video data;

a second frame buffer for storing the second plurality of video frames; and a display engine configured to generate a video output signal to display the second plurality of video frames, wherein the second video decoder engine is associated with a reverse mode or a fast-forward mode, and wherein the reverse mode or the fast-forward mode is associated with the at least one correlation coefficient, and wherein the first plurality of video frames and the second plurality of video frames represent two independently read versions of the video data.

2. The system of claim 1, wherein a first execution thread runs a first process that includes generating the at least one correlation coefficient using the first video decoder engine and the frame correlation engine, and a second execution thread runs a second process for displaying the video data using the second video decoder engine and the display engine.

3. The system of claim 2, wherein the frame correlation engine includes a pixel difference engine that applies a pixel difference function between each pixel in a first video frame of the at least two video frames and a corresponding pixel in a second video frame of the at least two video frames to generate a set of difference pixel values.

4. The system of claim 3, wherein the pixel difference function is applied using the luminance value associated with each pixel.

5. The system of claim 3, wherein the frame correlation engine further includes a pixel difference summing engine that adds together the difference pixel values to produce the at least one correlation coefficient.

6. The system of claim 2, wherein the frame correlation engine includes a frame histogram engine configured to generate a first histogram of the luminance values associated with the pixels in a first video frame of the at least two video frames and a second histogram of the luminance values associated with the pixels in a second video frame of the at least two video frames.

7. The system of claim 6, wherein the frame correlation engine further includes a histogram difference engine that applies a histogram difference function between an element in the first histogram and a corresponding element in the second histogram to generate a set of histogram difference values, and a histogram difference summing engine that adds together the histogram difference values to generate the at least one correlation coefficient.

8. The system of claim 2, wherein the frame correlation engine includes a pixel luminance correlation engine configured to:

apply a pixel difference function between the luminance value of each pixel in a first video frame of the at least two video frames and the luminance value of a corresponding pixel in a second video frame of the at least two video frames to generate a set of luminance difference values; and add together the luminance difference values to produce a first correlation coefficient.

9. The system of claim 8, wherein the frame correlation engine further includes a luminance histogram correlation engine configured to:

generate a first histogram of the luminance values associated with the pixels in the first video frame and a second histogram of the luminance values associated with the pixels in the second video frame;

apply a histogram difference function between an element in the first histogram and a corresponding element in the second histogram to generate a set of histogram difference values; and add together the histogram difference values to generate a second correlation coefficient.

10. The system of claim 2, further comprising a data transport element configured to transfer the at least one correlation coefficient to a central processing unit (CPU), wherein the first process also includes transporting the correlation coefficient to the CPU.

11. The system of claim 10, wherein a playback application executes on the CPU and is configured to determine whether a scene boundary exists between any of the at least two video frames based on the at least one correlation coefficient and to generate an entry in a list of scene transitions when a determination is made that a scene boundary exists, and wherein the first process also includes determining whether a scene boundary exists and generating the entry in the list of scene transitions.

12. The system of claim 11, wherein the entry indicates the time at which the scene boundary is located within the video data.

13. The system of claim 12, wherein the playback application is configured to receive user input to view the video data in the reverse mode or the fast-forward mode that allows the user to view the video data beginning at the scene boundary.

14. The system of claim 13, wherein the display engine is configured to generate a video output signal to display the video data beginning at the scene boundary based on a playback time control signal generated by the playback application in response to the user input.

15. A computing device configured to generate a list of content-based scene transitions within a stream of video data, the computing device comprising:

a graphics processing unit (GPU) configured to:
  receive the video data and generate a first plurality of video frames based on the video data;
  generate at least one correlation coefficient based on a comparison between at least two video frames in the first plurality of video frames, wherein the at least one correlation coefficient is used to determine whether a scene boundary exists between any of the at least two video frames;
  transmit the at least one correlation coefficient to a playback application via a graphics processing unit-to-central processing unit (GPU-to-CPU) coefficient data transport;
  generate a second plurality of video frames based on the video data, and
  generate a video output signal to display the second plurality of video frames; and a central processing unit (CPU) that, when executing the playback application, is configured to:
  determine whether a scene boundary exists between any of the at least two video frames based on the at least one correlation coefficient; and
  generate an entry in a list of scene transitions when a scene boundary exists, wherein the second plurality of video frames is associated with a reverse mode or a fast-forward mode, and wherein the reverse mode or the fast-forward mode is associated with the at least one correlation coefficient, and wherein the first plurality of video frames and the second plurality of video frames represent two independently read versions of the video data.

16. The computing device of claim 15, wherein a first execution thread runs a first process that includes generating the at least one correlation coefficient and generating the entry in the list of scene transitions based on the at least one correlation coefficient, and a second execution thread runs a second process for displaying the video data.

17. The computing device of claim 15, wherein a playback application executes on the CPU and is configured to receive user input to view the video data in the reverse mode or the fast-forward mode and to generate a playback time control signal in response to the user input that causes the GPU to display the video data beginning at the scene boundary.

18. The computing device of claim 15, wherein the GPU computes the at least one correlation coefficient using a pixel difference function or a histogram difference function.

19. A method for generating a list of content-based scene transitions within a stream of video data, the method comprising:
   receiving the video data and generating a first plurality of video frames based on the video data;
   generating at least one correlation coefficient based on a comparison between at least two video frames in the first plurality of video frames, wherein the at least one correlation coefficient is used to determine whether a scene boundary exists between any of the at least two video frames;
   transmitting the at least one correlation coefficient to a playback application via a graphics processing unit-to-central processing unit (GPU-to-CPU) coefficient data transport;
   generating a second plurality of video frames based on the video data;
   generating a video output signal to display the second plurality of video frames;
   causing a central processing unit (CPU) to determine whether a scene boundary exists between any of the at least two video frames based on the at least one correlation coefficient; and
   causing the CPU to generate an entry in a list of scene transitions when a scene boundary exists;
   wherein the second plurality of video frames is associated with a reverse mode or a fast-forward mode, and wherein the reverse mode or the fast-forward mode is associated with the at least one correlation coefficient, and
   wherein the first plurality of video frames and the second plurality of video frames represent two independently read versions of the video data.

20. The method of claim 19, wherein the steps of generating the first plurality of video frames and generating the correlation coefficient are performed at least partially in parallel with the steps of generating the second plurality of video frames and generating the video output signal.

* * * * *